Aug. 10, 1954  R. SHER  2,686,284
ANTENNA SECTOR SCAN CONTROL CIRCUIT
Filed Dec. 27, 1945  2 Sheets-Sheet 1

INVENTOR
RUDOLPH SHER
BY  M. O. Hayes
ATTORNEY

UNITED STATES PATENT OFFICE 2,686,284

ANTENNA SECTOR SCAN CONTROL CIRCUIT

Rudolph Sher, Boston, Mass., assignor, by mesne assignments, to the United States of America as represented by the Secretary of the Navy Application December 27, 1945, Serial No. 637,425

9 Claims. (Cl. 318—282)

This invention relates to electronic control circuits and more particularly to electronic sector scan control circuits employed in low frequency radar antenna scan systems which will compensate for any asymmetries in the circuit components or associated equipment.

An object of this invention is to provide an electronic sector scan control circuit.

Another object of this invention is to provide an electronic sector scan control circuit that is readily capable of varying the angle of scan.

A further object of this invention is to provide an electronic sector scan control circuit that will compensate for inherent asymmetries in the circuit components or associated equipment.

These and other objects will become apparent from a careful consideration of the specification and the accompanying drawings, in which.

Figure 1:
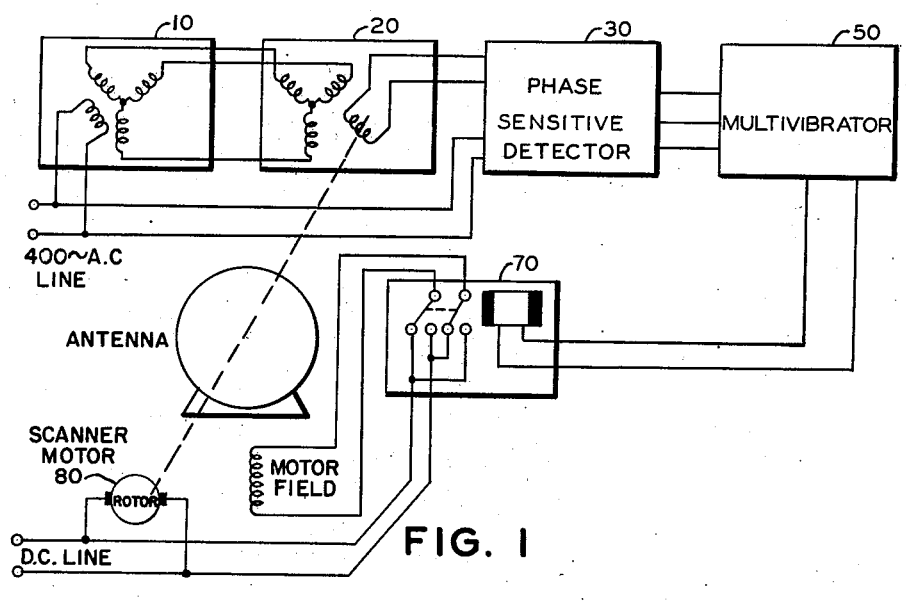
Fig. 1 is a block diagram of a sector scan system embodying the principles of the present invention.

Referring more specifically to the block diagram, Fig. 1, a synchro control transformer 20 having a rotor thereof mechanically connected to a scanner azimuth driving motor 80 and a stator electrically connected to a synchro generator 10, has its rotor electrical output connected to the grids of a phase sensitive detector 30. The negative direct current output voltages from the phase sensitive detector 30 are connected to the cathodes of a balanced multivibrator 50. A double-pole double-throw relay 70, having an actuating coil in one plate circuit of the multivibrator 50, controls the polarity of the direct current energizing the azimuth scanner driving motor 80.

As is known in the art, the output voltage from a synchro control transformer, called the error signal, has an amplitude proportional to the sine of the angle, $\Delta$, between the synchro control transformer rotor and the synchro generator rotor, the polarity of which with respect to the input voltage to the synchro generator is the same as the algebraic sign of the angle $\Delta$.

Figure 2:
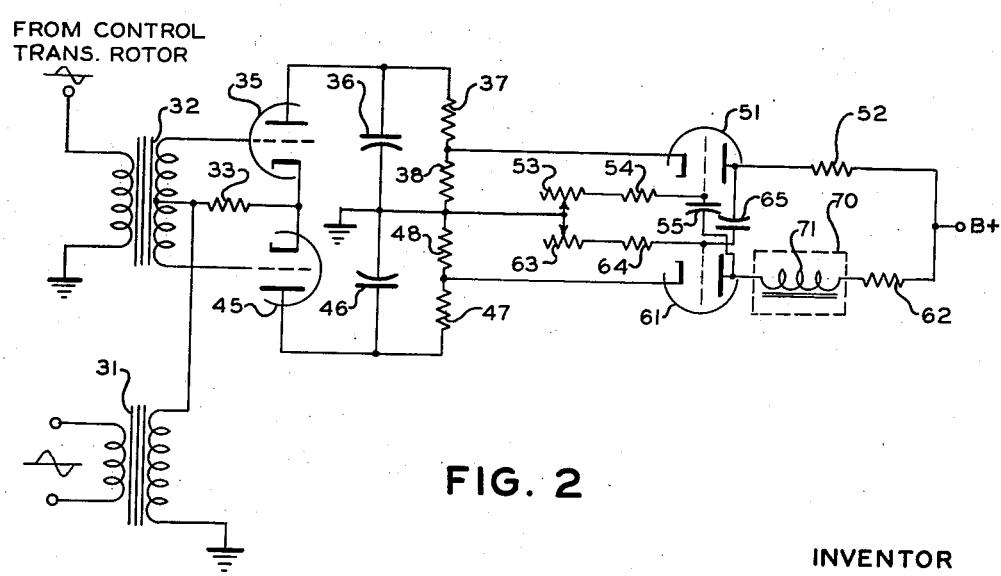
Fig. 2 is a circuit diagram of a portion of the invention.

Referring to the circuit diagram, Fig. 2, the error signal output from the synchro control transformer 20, of Fig. 1, is fed to the grids of triodes 35 and 45 of phase sensitive detector 30 through a step-up transformer 32 having a center tapped output winding; thus, the input signal to one grid is 180° out of phase with respect to the input signal to the other grid. The plate of triode 35 connects to ground through a resistor-capacitor circuit having a long time constant and consisting of resistors 37 and 38 in series bypassed by condenser 36. The plate of triode 45 is similarly connected, through resistors 47 and 48 and condenser 46. The cathodes of triodes 35 and 45 are connected together, and through a resistor 33 to the midtap of the output winding of the transformer 32. The midtap is further connected to a step-up transformer 31, the input winding of which is energized by the same alternating current input to the synchro generator 10 shown in Fig. 1. The multivibrator 50, comprising triodes 51 and 61, has the cathode of triode 51 connected to the ungrounded side of resistor 38 of the phase sensitive detector 30, while the cathode of triode 61 is similarly connected to resistor 48. The grid of triode 51 is returned to ground through fixed resistor 54 and variable resistor 53, while the plate is connected first through resistor 52 to a source of positive direct current, B+, and second to the grid of triode 61 through condenser 65. The grid of triode 61 is returned to ground through fixed resistor 64 and variable resistor 63, while the plate is connected to the aforementioned source of positive direct current, B+, through relay actuating coil 71 of the relay 70, discussed in connection with Fig. 1, and resistor 62 in series, and coupled to the grid of triode 51 by condenser 55. The variable resistors 53 and 63 are gang operated. The resistance value of resistor 62 is equal to the resistance of resistor 52 minus the resistance of the relay actuating coil 71.

The operation of the multivibrator sector scan control circuit may be understood by considering the device in operation and analyzing one cycle of this operation. As is known in the art, the negative voltage developed across load resistors 37, 38 and 47, 48 of phase sensitive detector 30 will become more negative as the input grid voltage becomes less negative.

Figure 3:
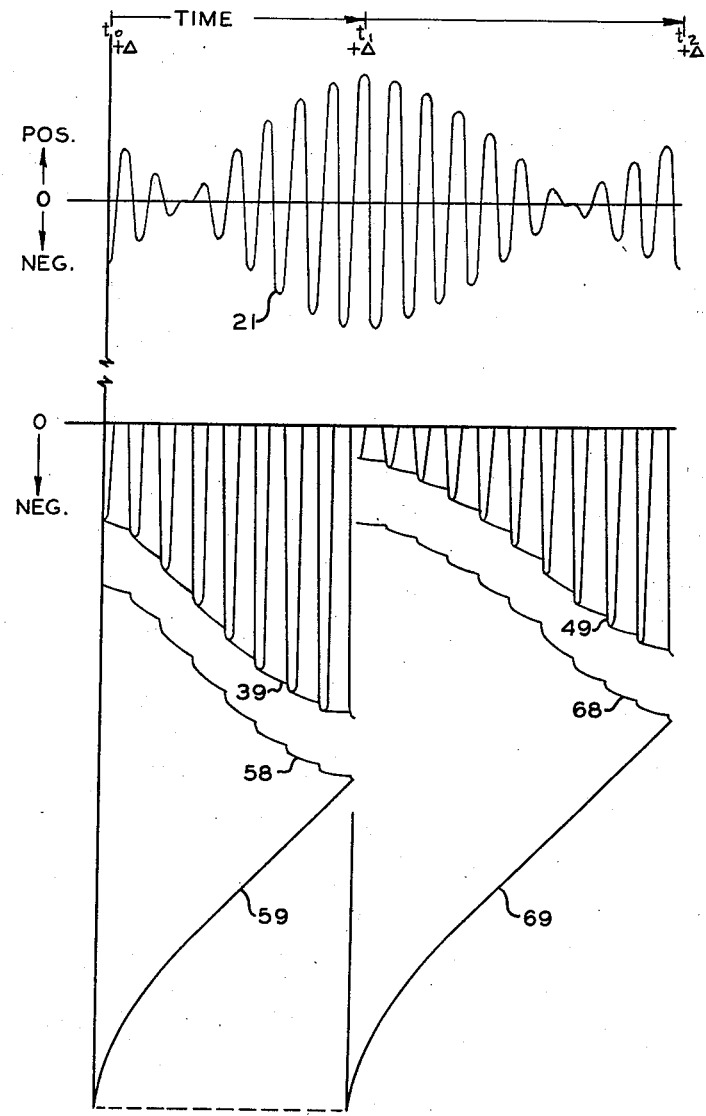
Fig. 3 is a graph showing certain voltage-time relationships that exist in elements of the invention during one cycle of operation.

Referring to Fig. 3 and assuming at a time $t_0$, that the triode 61 of multivibrator 50 has just started conducting causing the contacts of double-pole double-throw relay 70 to close in one position, and that the error angle of the rotor winding of synchro control transformer 20 is a positive angle, $+\Delta$; the output voltage 21 from the rotor winding, initially in phase with the voltage applied to the cathodes of phase sensitive detector 30, will decrease sinusoidally to zero, reverse phase relation and increase sinusoidally. This will cause the negative voltage 39 across resistor 38 to become increasingly negative, as there is no multivibrator current flowing through resistor 38. This increasing negative voltage 39 applied to the cathode of triode 51 of multivibrator 50 will reduce the cut off voltage 58 until, at a time $t_1$, it equals the rising grid voltage 59 of triode 51. At this time $t_1$, tube 51 will conduct and drive the grid voltage 69 of triode 61 negative, cutting off triode 61 and deenergizing double-pole double-throw relay coil 71 and closing its contacts in the reverse position. In a similar manner, the increasing negative voltage 49 developed across resistor 48 will reduce the cutoff voltage 68 of triode 61 until at a time $t_2$ it becomes the same value as the rising grid voltage 69 of triode 61. At this time tube 61 will conduct, completing the cycle.

In Fig. 3, a condition has been illustrated where the scanner azimuth driving motor 80 runs faster in one direction, as determined by the contacts of relay 70, than in the other direction. Thus, time $(t_2-t_1)$ is greater than $(t_1-t_0)$, and therefore the angles of scan will be equal. Although it has not been illustrated, it is readily seen that other asymmetries, such as may occur in the multivibrator 50, the phase sensitive detector 30, or the rotor winding of the synchro control transformer 20, will be compensated for. It is further seen that the period or time of one cycle of operation, and thus the angle of the scan, may be varied by increasing or decreasing the gang operated variable resistors 53 and 63, as this will correspondingly increase or decrease the time constants of the multivibrator components, and will vary the time during which the motor 80 runs in one direction when energized by the contacts of relay 70. It is further seen that the center position of the scan may be varied by rotating the rotor of the synchro generator 10.

What is claimed is:

1. A remote control circuit for controlling the rotation of a reversible motor forward and back through a selected position by positioning a reversing switch comprising, a power driven switch for effecting reversal of rotation of said motor, a bistable multivibrator for generating a cyclic output voltage, means for applying said output voltage to energize said switch during part of its cycle and de-energize said switch during the remainder of its cycle, means to adjust the period of said multivibrator, a self-synchronous servomechanism positional data transmission system coupled to said motor and having an input shaft adapted to be positioned to indicate said selected position and developing an output potential having phase and magnitude dependent upon the direction and sine of angular deviation respectively of said motor with respect to said selected position, a phasesensing detector responsive to said potential to produce a unidirectional potential for each direction of motion respectively of said motor, and means applying said output potentials to bias said multivibrator to control the cycle of operation thereof.

2. In a radio locating system comprising elements including a directional antenna structure rotatable about an axis, a reversible motor mechanically coupled to said antenna structure, a power driven switch mechanism for effecting reversal of operation of said motor to cause said antenna structure to be actuated through a desired sector, a motor control circuit for controlling the amplitude and mean position of said sector comprising, a bistable multivibrator for generating a cyclic output voltage, means for applying said output voltage to energize said power driven switch during part of its cycle and de-energize said switch during the remainder of its cycle, means to adjust the period of said multivibrator to control the amplitude of said sector, a self-synchronous servomechanism positional data transmission system mechanically coupled to said motor and having an input shaft adapted to be positioned to indicate the mean position of said sector and developing an output potential having phase and magnitude depending upon the direction and sine of angular deviation of said motor with respect to said mean position, a phase sensitive detector responsve to said output potential to produce unidirectional output potentials for each direction of motion having amplitudes related to said angular deviation, and means for applying said output potentials to bias said multivibrator to control the cycle of operation thereof.

3. A control circuit for operating a reversing switch to energize a reversible motor for motion forward and back through a selected position comprising, an electromagnetic relay adapted when energized to position said switch for motor operation in one direction and when de-energized to position said switch for motor operation in a reverse direction, a bistable multivibrator connected to energize said relay during part of its cycle, means to adjust the period of said multivibrator, means to generate an output potential varying in amplitude and phase with the amount and direction of departure of said motor from said position, and means for biasing said multivibrator in response to said potential to control the cyclic operation thereof.

4. A control circuit for operating a reversing switch to cause a motor to move back and forth about a selected position comprising, an electromagnetic relay adapted to operate said reversing switch, a bistable multivibrator for generating a cyclic voltage having a substantially rectangular wave form, means for connecting said multivibrator to energize said relay during a portion of said cycle for motor operation in a first direction of motion and to de-energize said relay during the remainder of said cycle for motor operation in a reverse direction of motion, means for adjusting the period of said multivibrator, means generating an output potential varying in amplitude and phase with the amount and direction of departure of said motor position from said selected position, means to convert said output potential to a unidirectional signal, and means for biasing said multivibrator in response to said signal to control the generation of said cyclic voltage.

5. A control circuit for causing a reversible motor to oscillate about a selected position comprising, a source of power, an electrically operated device for controlling the application of power from said source to said motor, a bistable multivibrator for generating a cyclic output voltage, means for adjusting the period of said multivibrator oscillator, means for connecting said multivibrator to energize said device during part of said cycle to apply power from said source to cause said motor to move in a given direction and to de-energize said device during the remainder of said cycle to apply power from said source to cause said motor to reverse the direction of motion, means responsive to said motor position and said selected position to generate an output potential having amplitude and phase related to amount and direction respectively of departure of said motor position from said selected position, a phase sensitive detector for deriving from said output potential a unidirectional potential for each direction of motion, and means for applying said unidirectional potentials to bias said multivibrator to control the cyclic operation thereof.

6. A control circuit for causing a reversible motor to oscillate about a selected point comprising, a source of power, an electrically operated switch adapted when energized to apply power from said source to said motor for motion in one direction and when de-energized to apply power from said source to said motor for motion in a reverse direction, a bistable multivibrator circuit having two electron tubes, the conduction of one of said tubes biasing the second of said tubes to nonconduction for a time interval related to the time constants of the circuit to generate a cyclic output voltage having a substantially rectangular wave form, means for adjusting the time constants of said multivibrator circuit to control the period thereof, means for connecting said switch to be energized by the conduction of one of said tubes whereby shift of conduction of said electron tubes reverses direction of motion of said motor, means responsive to said motor position and said selected point to generate an output potential having amplitude and phase related to amount and direction respectively of departure of said motor position from said selected point, a phase sensitive detector for deriving from said output potential a unidirectional potential for each direction of motion, and means for applying said unidirectional potentials to bias said electron tubes to control the shift of conduction thereof in response to the position of said motor.

7. A control circuit for causing a reversible motor to oscillate about a selected point comprising, a source of power, an electrically operated switch adapted when energized to apply power from said source to said motor for motion in one direction and when de-energized to apply power from said source to said motor for motion in a reverse direction, a bistable multivibrator circuit having two electron tubes, the conduction of one of said tubes biasing the second of said tubes to nonconduction for a time interval related to the time constants of the circuit to generate a cyclic output voltage having a substantially rectangular wave form, means for adjusting the time constants of said multivibrator circuit to control the period of said wave form, means for connecting said switch to be energized by the conduction of one of said tubes whereby shift of conduction of said electron tubes reverses direction of motion of said motor, a self-synchronous servomechanism positional data transmission system coupled to said motor having an input shaft adapted to be positioned to indicate said selected point and developing an output potential having phase and magnitude dependent upon the direction and sine of angular deviation respectively of said motor with respect to said selected point, a phase sensitive detector for converting said output potential to a unidirectional signal for each direction of motion, and means for applying said unidirectional signals to bias said electron tubes to control the shift of conduction thereof in response to the position of said motor.

8. A remote control circuit for controlling the rotation of a reversible motor forward and back through a selected position by positioning a reversing switch comprising, a power driven switch for effecting reversal of rotation of said motor, a bistable multivibrator for generating a cyclic output voltage, means for connecting said switch to said multivibrator to energize said switch during a part of its cycle and deenergize said switch during the remainder of its cycle, means to adjust the period of said multivibrator, a self-synchronous servomechanism positional data transmission system coupled to said motor and having an input shaft adapted to be positioned to indicate said selected position and developing an output potential having phase and magnitude dependent upon the direction and sign of angular deviation respective of said motor with respect to said selected position, a phase sensing detector responsive to said output potential to produce a unidirectional potential for each direction of motion respectively of said motor, and means applying said output potentials to bias said multivibrator to control the cycle of operation thereof.

9. In a radio locating system comprising elements including a directional antenna structure rotatable about an axis, a reversible motor mechanically coupled to said antenna structure, a power driven switch mechanism for effecting reversal of operation of said motor to cause said antenna structure to be actuated through a desired sector, a motor control circuit for controlling the amplitude and mean position of said sector comprising, a bistable multivibrator for generating a cyclic voltage, means for connecting said power driven switch to said multivibrator to energize said power driven switch during part of the cycle of said multivibrator and deenergize said switch during the remainder of said cycle, means to adjust the period of said multivibrator to control the amplitude of said sector, a self-synchronous servomechanism positional data transmission system mechanically coupled to said motor and having an input shaft adapted to be positioned to indicate the mean position of said sector and developing an output potential having phase and magnitude depending upon the direction and sign of angular deviation of said motor with respect to said mean position, a phase sensitive detector responsive to said output potential to produce unidirectional output potentials for each direction of motion having amplitudes related to said angular deviation, and means for applying said unidirectional potentials to bias said multivibrator to control the cycle of operation thereof.

References Cited in the file of this patent

UNITED STATES PATENTS

| Number | Name | Date |
|--------|------|------|
| 2,406,853 | Richardson | Sept. 3, 1946 |
| 2,416,166 | Farrow | Feb. 18, 1947 |
| 2,417,248 | Godet | Mar. 11, 1947 |
| 2,482,143 | Watt | Sept. 20, 1949 |
| 2,515,850 | Benson | July 18, 1950 |